United States Patent
Suzuki et al.

(10) Patent No.: US 6,456,586 B1
(45) Date of Patent: Sep. 24, 2002

(54) MAGNETO-OPTICAL RECORDING MEDIUM AND PROCESS FOR PRODUCING THE SAME

(75) Inventors: Ippei Suzuki, Tenri; Naoyasu Iketani, Matsudo; Yoshiteru Murakami, Nishinomiya; Akira Takahashi, Nara, all of (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/392,248

(22) Filed: Sep. 9, 1999

(30) Foreign Application Priority Data

Sep. 10, 1998 (JP) .......................... 10-256253

(51) Int. Cl.[7] .............................. G11B 11/10
(52) U.S. Cl. ..................................... 369/286
(58) Field of Search ................ 369/286, 283, 369/272, 13, 75.2; 428/694 MT, 694 ML

(56) References Cited

U.S. PATENT DOCUMENTS

| | | | |
|---|---|---|---|
| 5,191,565 A | * 3/1993 | Inoue et al. | 369/284 |
| 5,233,575 A | * 8/1993 | Uchino et al. | 369/13 |
| 5,309,427 A | * 5/1994 | Matsumoto | 369/275.2 |
| 5,635,267 A | * 6/1997 | Yamada et al. | 428/64.4 |
| 5,691,072 A | * 11/1997 | Izumi et al. | 428/624 ML |
| 5,821,004 A | * 10/1998 | Hino et al. | 428/694 ML |
| 5,889,739 A | * 3/1999 | Nishimura et al. | 368/13 |
| 5,901,118 A | * 5/1999 | Iketani et al. | 369/13 |
| 5,999,512 A | * 12/1999 | Furuta | 369/275.1 |
| 6,147,939 A | * 11/2000 | Takahashi et al. | 369/13 |
| 6,261,707 B1 | * 7/2001 | Murakami et al. | 428/694 ML |

FOREIGN PATENT DOCUMENTS

| | | |
|---|---|---|
| JP | 6-150418 A | 5/1994 |
| JP | 9-231631 A | 9/1997 |

* cited by examiner

*Primary Examiner*—David L. Ometz
*Assistant Examiner*—Franklin D. Altman
(74) *Attorney, Agent, or Firm*—Nixon & Vanderhye P.C.

(57) ABSTRACT

A magneto-optical recording medium comprising a reproducing magnetic layer having a magnetic layer which is in an in-plane magnetization state at room temperature but shifts to a perpendicular magnetization state as temperature rises, a dielectric layer and a recording magnetic layer having a magnetic layer which exhibits a perpendicular magnetization, sequentially from a photo-receptive side, the recording medium being further comprising a metal layer between the reproducing magnetic layer and the dielectric layer.

19 Claims, 3 Drawing Sheets

MAGNETO-OPTICAL RECORDING MEDIUM AND PROCESS FOR PRODUCING THE SAME

CROSS-REFERENCE TO RELATED APPLICATION

This application is related to Japanese application No. HEI 10(1998)-256253 filed on Sep. 10, 1998, whose priority is claimed under 35 USC §119, the disclosure of which is incorporated by reference in its entirety.

BACKGROUND OF THE INVENTION

1. Field of the Invention

The present invention relates to a magneto-optical recording medium on which information is recorded and from which information is reproduced with irradiation of light.

2. Description of Related Art

Magneto-optical recording media have been in actual use as rewritable optical recording media. With such a magneto-optical recording medium, there is found a defect that reproducing characteristics deteriorate as the size of a recording bit, which is a unit magnetic area for recording, and the interval between recording bits become smaller than the diameter of a spot of a light beam which is emitted from a semiconductor laser and converged onto the magneto-optical recording medium.

The cause for this defect is that recording bits adjoining a targeted recording bit fall within the spot of the light beam converged on the targeted recording bit and therefore individual recording bits cannot be separately reproduced.

In order to eliminate the above-described defect, Japanese Unexamined Patent Publication No. HEI 6(1994)-150418 proposes a magneto-optical recording medium constructed to have a reproducing layer which is in an in-plane magnetization state at room temperature and changes into a perpendicular magnetization state as temperature rises, a recording layer and a non-magnetic intermediate layer provided between the reproducing layer and the recording layer to couple the reproducing layer and the recording layer magnetostatically. In this recording medium, by utilizing a heat distribution in the light beam spot, information transferred from the recording layer to the reproducing layer is reproduced only in a recording bit at a temperature higher than a threshold temperature. With this constitution, if adjoining recording bits are within the spot of the converged light beam, information in the targeted recording bit can be separately reproduced.

Japanese Unexamined Patent Publication No. HEI 9(1997)-231631 proposes a construction wherein a layer of a metal film or a layer of a dielectric film and a metal film is provided between the reproducing layer and the recording layer. With this constitution, it is possible to control a leakage magnetic field generated from magnetization present in the reproducing layer and also to utilize light reflected by the metal film positively. Therefore, favorable reproducing characteristics can be obtained.

However, the above-described Japanese Unexamined Patent Publications Nos. HEI 6(1994)-150418 and HEI 9(1997)-231631 cannot provide good recording and reproducing characteristics when smaller-sized recording bits and smaller intervals between recording bits are adopted. Accordingly, there is a problem that it is impossible to realize a higher-density recording and reproducing than now and therefore a larger memory capacity cannot be expected.

SUMMARY OF THE INVENTION

Under these circumstances, an object of the present invention is to provide a magneto-optical recording medium permitting improvement in the quality of reproducing signals and in recording an reproducing characteristics and allowing a higher-density recording and reproduction, as well as a production process for such a medium.

The present invention provides a magneto-optical recording medium provided with a reproducing magnetic layer having a magnetic layer which is in an in-plane magnetization state at room temperature but shifts to a perpendicular magnetization state as temperature rises; a dielectric layer; and a recording magnetic layer having a magnetic layer which exhibits a perpendicular magnetization, sequentially from a photo-receptive side, the recording medium being characterized by further comprising a metal layer between the reproducing magnetic layer and the dielectric layer.

These and other objects of the present application will become more readily apparent from the detailed description given hereinafter. However, it should be understood that the detailed description and specific examples, while indicating preferred examples of the invention, are given by way of illustration only, since various changes and modifications within the spirit and scope of the invention will become apparent to those skilled in the art from this detailed description.

DESCRIPTION OF THE PREFERRED EMBODIMENTS

The present invention has been achieved from findings for the first time that, in a magneto-optical recording medium having a reproducing magnetic layer exhibiting in-plane magnetization at room temperature and perpendicular magnetization when heated to a critical temperature or higher, excellent characteristics which permit realization of a high recording density are obtained by providing a metal film (especially so thin a metal film that it hardly functions as a reflecting film) or the like in contact with or in proximity to the reproducing magnetic layer. Also it has been found for the first time that good recording and reproducing characteristics are obtained with a construction having the metal layer or the like and a dielectric film formed from the reproducing magnetic layer in this order.

Figure 5:
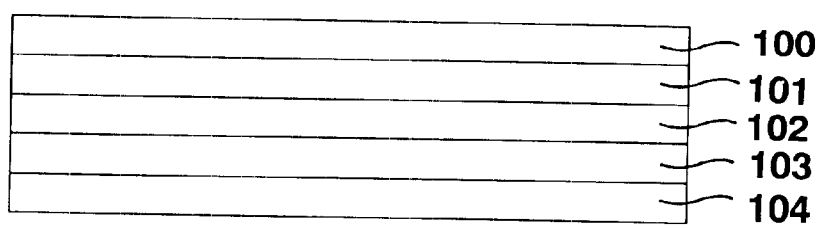
FIG. 5 is a diagram illustrating a construction of films in a magneto-optical recording medium of a comparative example, i.e., a conventional magneto-optical recording medium.

The construction of the present invention is completely different from that of conventional magneto-optical recording media used for minidisks (MDs) and the like. As shown in FIG. 5, in the conventional magneto-optical recording medium, a transparent dielectric layer 101, a magneto-optical recording and reproducing layer 102, a transparent dielectric layer 103 and a reflective metal layer 104 are sequentially formed on a substrate 100. The reflective metal layer 104 is provided for reflecting light having passed through the magneto-optical recording and reproducing layer 102 so as to increase a Kerr rotation angle by an interference effect with light incident onto the magneto-optical recording and reproducing layer 102. The transparent dielectric layer 103 is provided for enhancing the interference effect.

On the other hand, the magneto-optical recording medium of the present invention basically has ① a reproducing magnetic layer, a metal film, a dielectric layer and a recording magnetic layer in this order, ② a reproducing magnetic layer, a metal film and a recording magnetic layer in this order, or ③ a reproducing magnetic layer, a dielectric layer and a recording magnetic layer in this order. In addition to these basic constructions, the magneto-optical recording medium optionally may have one of or two or more of a substrate, a transparent dielectric layer, a dielectric layer, a heat radiation layer, an overcoat layer and the like at any position.

The reproducing magnetic layer has a magnetic layer which is in the in-plane magnetization at room temperature and changes into the perpendicular magnetization as temperature rises, that is, at a critical temperature or higher. Materials for forming the reproducing magnetic layer are not particularly limited, but single layers and multilayers of GdFeCo, TbFeCo, DyFeCo, HoFeCo, GdTbFe, GdDyFeCo, GdTbFeCo and the like may be mentioned, for example. As regards these alloys, since their compensation temperatures (and/or Curie temperatures) vary with changing their compositions, i.e., the contents of their component elements, the compositions may be adjusted as appropriate for use. For further improvement of reproducing characteristics, another magnetic layer may be added which is in the in-plane magnetization state at room temperature and has such a low Curie temperature that it loses magnetization around a reproducing temperature.

The metal film is composed of a material having a higher thermal conductivity than the reproducing magnetic layer. For example, single layers and multilayers of metals such as Al, Au, Ti, Ag, Cu and the like, single layers or multilayers of alloys such as AlNi, AlTi, AlSi, AgTi and the like, and multilayers of these metals with these alloys may be mentioned. The thickness of the metal layer is preferably be 30 nm or less, more preferably 6 nm or less. Additionally, the metal film in construction ① may be formed either in the form of a separate "film" having a clear boundary or in the form of a high-concentration region in the dielectric layer, described in detail below. This high-concentration region is located on a side of the dielectric layer to the reproducing magnetic layer, and in the region a metal other than the metal composing the reproducing magnetic layer exists in a higher concentration than in other part of the dielectric layer.

The recording magnetic layer has a magnetic layer exhibiting the perpendicular magnetization, which is preferably maintained f rom room temperature to the Curie temperature especially. Materials for the recording magnetic layer are not particularly limited, but for example, single layers and multilayers of DyFeCo, TbFeCo, GdTbFe, NdDyFeCo, GdDyFeCo, GdTbFeCo and the like may be mentioned. As regards these alloys, since their Curie temperatures vary with changes in their compositions, i.e., the contents of their component elements, the compositions may be adjusted as appropriate for use. Also, for further improvement of recording characteristics, another magnetic layer (recording assisting layer) may be added which exhibits the perpendicular magnetization and has a smaller coercive force around a recording temperature than the recording magnetic layer.

Materials for the dielectric layer are not particularly limited, but for example, single layers and multilayers of AlN, SiN, AlSiN, AlTaN, SiAlON, TiON, BN, ZnS, $TiO_2$, $BaTiO_3$, $SrTiO_3$ and the like may be mentioned. The thickness of the dielectric layer is preferably be about 1 to 10 nm, for example. Especially, the dielectric layer in construction ③ is preferably be formed of such a material in such a composition that a metal other than the metal composing the reproducing magnetic layer is present in a higher concentration on the side to the reproducing magnetic layer than in other part of the dielectric layer, because a metal layer is not provided in the magneto-optical magnetic medium of construction ③. Here the metal other than the metal composing the reproducing magnetic layer means a material having a better thermal conductivity (a material for enhancing heat response) than that of the reproducing magnetic layer.

In the magneto-optical recording medium of the present invention, the above-described layers including the reproducing magnetic layer are preferably formed on a substrate. The substrate is not particularly limited to any type provided that it is a transparent substrate having a light transmittance of 90% or more. For example, usable are a glass substrate, a silica glass substrate, a chemically enhanced glass substrate, a glass substrate having a film of an ultraviolet-curing resin formed on its surface, and plastic substrates such as of a polycarbonate, polymethylmethacrylate, amorphous polyolefin, polystyrene, polybiphenyl chloride and epoxy resin. Preferably, the substrate has a guide track for guiding a light beam and lands and grooves for obtaining information such as an address signal, as conventionally known. The width and depth of the guide track, the width of the land, and the width and depth of the groove are not particularly limited and may be designed depending upon intended characteristics of the magneto-optical recording medium to be obtained.

A transparent dielectric layer may be formed on the substrate. As the transparent dielectric layer, usable is any one of the above-mentioned dielectric materials that is capable of providing a light transmittance of 90% or more in a possible thickness. Usually, the reproducing magnetic layer is formed on the transparent dielectric layer.

Further, a dielectric layer may be formed between the metal film and the recording magnetic layer and/or on the recording magnetic layer. This dielectric layer may also be formed of the above-mentioned dielectric material.

A heat radiation layer may be formed on the recording magnetic layer with or without intervention of the dielectric layer. Materials for the heat radiation layer and its thickness are not particularly limited provided that it provides a higher thermal conductivity than that of the recording magnetic layer.

Preferably, an overcoat layer is formed on the recording magnetic layer with or without intervention of the dielectric layer and with or without intervention of the heat radiation layer. The overcoating layer may be formed of an ultraviolet curing resin, for example.

EXAMPLES

The invention is now explained in further detail by way of examples thereof with reference to the accompanying drawings.

Example 1

Figure 1:
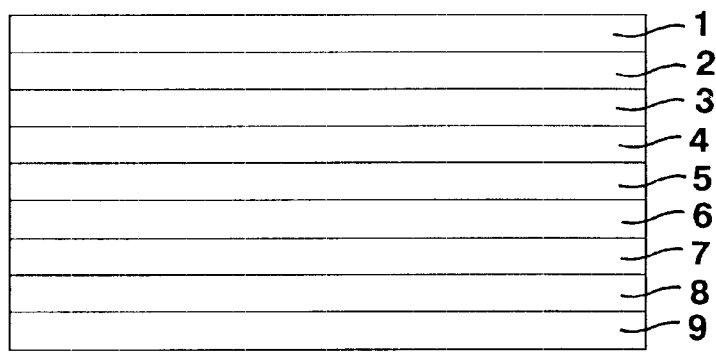
FIG. 1 is a diagram illustrating a construction of films in a magneto-optical recording medium in accordance with Example 1 of the present invention.

As shown in FIG. 1, a magneto-optical disk in accordance with this example was constructed to have a substrate 1, a transparent dielectric layer 2, a reproducing magnetic layer 3, a metal layer 4, a dielectric layer 5, a recording magnetic layer 6, a dielectric layer 7, a heat radiation layer 8 and an overcoat layer 9 laminated in this order from a photoreceptive face. It is noted that the substrate 1 and the overcoat layer 9 are replaced with each other in the case of a magneto-optical disk which receives light from the opposite direction.

(1) Constitution

The substrate 1 was a substrate of polycarbonate of 0.6 mm thickness. The above-mentioned layers except the overcoat layer were laminated on the substrate 1 by sputtering.

A film of AlN was formed to a thickness of 65 nm as the transparent dielectric layer 2 on a side of the substrate 1 on which the guide track was formed.

A two-layered magnetic layer of GdFeCo and GdFe were formed as the reproducing magnetic layer 3 on the transparent dielectric layer 2. First, the GdFeCo layer was formed to a thickness of 25 nm and then the GdFe layer was formed to a thickness of 15 nm. The GdFe layer was provided for enhancing reproduction characteristics. The direction of magnetization of the GdFeCo layer was substantially in plane (i.e., an in-plane direction within the reproducing magnetic layer 1, at room temperature, and shifted from the in-plane direction to a perpendicular direction at temperatures of about 160 to 180° C. The GdFe layer maintained the in-plan magnetization state from room temperature to its Curie point, which is about 150° C.

A film of Al was formed to a thickness of 2 nm as the metal layer 4 on the reproducing magnetic layer 3. The Al film was formed by sputtering an Al target of a 3N purity. It is noted that the metal layer 4 of such a thinness hardly acted as a reflective film.

A film of AlN was formed to a thickness of 3nm as the dielectric layer 5 on the metal layer 4.

A two-layered magnetic layer of TbFeCo and GdFeCo were formed as the recording layer 6 on the dielectric layer 5. The TbFeCo magnetic layer was first formed to a thickness of 50 nm and then the GdFeCo layer was formed to a thickness of 15 nm. The GdFeCo layer was provided for enhancing a recording magnetic field sensitivity. The TbFeCo layer was a film in the perpendicular magnetization at room temperature, and the Curie point thereof was about 240° C. The GdFeCo layer was a film in a perpendicular magnetization at room temperature, and the Curie point thereof was about 280° C.

A film of AlN was formed to a thickness of 10 nm as the dielectric layer 7 on the recording magnetic layer 6. A film of AlNi was formed to a thickness of 20 nm as the heat radiation layer 8 on the dielectric layer 7. An ultraviolet curing resin was coated on the heat radiation layer 8 by spin-coating and irradiated with an ultraviolet ray to form the overcoat layer 9.

(2) Recording and Reproducing Characteristics

The above-described magneto-optical disk was evaluated on recording and reproducing characteristics: An (a) C/N, (b) a minimum recording power, (c) a recording power margin and (d) a reproducing power margin. As a comparative example, a magneto-optical disk which did not have the metal layer 4 was evaluated on the recording and reproducing characteristics as well. The results are shown in Table 1. The comparative example was the same as the magneto-optical disk of Example 1 except that it did not have the metal film 4 and the dielectric layer 7 of AlN was 5 nm thick instead of 10 nm.

TABLE 1

| | C/N (0.4 μm) | Minimum Recording Power | Recording Power Margin | Reproducing Power Margin |
|---|---|---|---|---|
| Ex. 1 (with a metal film 2 nm thick) | 44.5 dB | 9 mW | ±13% | ±13% |
| Com. Ex. (without metal film) | 43.0 dB | 10 mW | ±13% | ±7% |

Conditions in evaluating the characteristics were as follows:

An optical pickup: wavelength of a semiconductor laser= 640 nm, numerical aperture of an objective lens=0.6

Disk linear speed=5.0 m/sec

Track shape on the substrate: land/groove width=0.5 μm/0.5 μm, groove depth=50 nm Recording method: optical pulse magnetic field modulation recording method (optical pulse duty=30%, recording magnetic field intensity=200 Oe), land/ groove recording modulation method (NRZI minimum recording mark length=0.21 μm).

The three characteristics except the C/N were based on results obtained by recording an NRZI random modulation pattern of a 0.21 μm minimum recording mark length and determining a BER (bit error rate) of a reproduction signal. A threshold for evaluating the BER was set to $1 \times 10^{-4}$, and the range of powers providing better BERs than this threshold was shown as the recording power margin and the reproducing power margin.

(a) C/N

Repeated recording bits of 0.4 μm length were recorded and the C/N thereof was determined. An improvement of about 1.5 dB was observed with the magneto-optical disk of the present invention compared with the comparative example.

The inventors of the present invention presume that the insertion of the metal film 4 improved the C/N for the following reason (principle).

A light beam incident from the photo-receptive face of the recording medium was first absorbed by the reproducing magnetic layer 3 and converted to heat. Heat accumulated in the reproducing magnetic layer 3 tended to spread both in the in-plane direction within the film and in a direction of the thickness of the film. However, since the metal film 4 was mounted on the rear side of the reproducing magnetic layer 3, more heat traveled to the metal film 4 (i.e., in the direction of the thickness of the film). Accordingly, in the reproducing magnetic layer 3, the mounting of the metal film 4 suppressed the spread of heat in the in-plane direction of the film. Therefore, it is considered that temperature distribution in the medium became abrupt when a light beam was irradiated and thereby that the C/N may was improved.

This is explained in further detail.

In a MSR (magnetic super resolution) medium with use of the reproducing magnetic layer 3 whose magnetization direction changes from the in-plane one to the perpendicular one like this example, the temperature distribution in the light beam spot is utilized so that data in recording bits transferred from the recording magnetic layer 6 to the reproducing magnetic layer 3 is reproduced only in a region having a higher temperature (an effective aperture) than a given threshold temperature. In a region having a lower temperature than the threshold temperature (a masked region), since the reproducing magnetic layer 3 has the in-plane magnetization, magnetic data in the recording magnetic layer 6 cannot be seen.

However, the magnetization of the reproducing magnetic layer 3 changes from the in-plane magnetization to the perpendicular magnetization in a certain temperature range. This change does not occur digitally. For this reason, in a region between the effective aperture and the masked region, i.e., in a doughnut-like region surrounding the effective aperture, the direction of magnetization of the reproducing magnetic layer 3 is diagonal. This results in noise during reproduction and deteriorates the quality of signals. This region is generally referred to as a gray region.

It is considered that, in Example 1, since the temperature distribution in the medium was able to be made abrupt as described above, the above-mentioned gray region was reduced in area, therefore noise was suppressed and the C/N was improved.

Further, the following effect may be expected.

If an abrupt temperature distribution can be realized in the medium, accumulation of heat within the reproducing magnetic layer 3 can be prevented and heat can be transmitted effectively to the recording magnetic layer. Accordingly a time-relating heat response is improved. Thereby the C/N can also be improved.

The reason is as follows:

When the recorded data is reproduced, the light beam spot moves on a rotating disk. If the heat response is improved, the distance between the center of the light beam spot and a heat center of the recording medium (at which the temperature of the recording medium is the highest) can be decreased. For example, in the MSR medium disclosed by Japanese unexamined Patent Publication No. HEI 6(1994)-150418, data in the recording magnetic layer is read out at the heat center and the light intensity is strongest at the center of light beam spot. Accordingly by improving the heat response so that the center of the light beam spot is brought close to the heat center, a signal of a larger intensity can be obtained and therefore the C/N can be improved.

(b) Minimum Recording Power

The smaller the minimum recording power necessary for providing a BER of $1 \times 10^{-4}$ or less is, the smaller output the laser is required to produce and thus the more advantageous the recording medium becomes. It is also advantageous for the case where a higher data transfer is required, that is, the linear speed of the disk is high.

Table 1 shows that the magneto-optical disk of Example 1 had the effect of allowing an improvement of 1 mW compared with the comparative example.

The reason for this improvement can be explained as follows:on the ground of the principle given in the above (a) C/N.

Because the metal film 4 was provided, the heat accumulated in the reproducing magnetic layer 3 was apt to be conducted toward the metal film 4 (in the direction of the thickness of the layer). The metal film 4 was so thin and had so small a heat capacity that the heat conducted to the metal layer 4 did not remain within the metal film 4 but traveled to the recording magnetic layer 6. That is, because the metal film 4 functioned to conduct excess heat in the reproducing magnetic layer 3 to the recording magnetic layer 6, heat necessary for recording could be obtained with a light beam of a smaller power. For this reason, the minimum recording power declined.

(c) Recording Power Margin

This experiment was based on a generally called land/groove recording which is most advantageous for high-density recording. First, recording was made on any land at a certain recording power Pwa. Then, recording was made in both adjacent grooves at the same recording power. Thereafter, the BER of the first recorded land was determined. This set of procedure was repeated at different recording powers. The lower limit of the recording power was just as explained in the above (b) minimum recording power. The upper limit thereof was determined as follows. Generally, where the recording power is too high, cross-write occurs. In other words, when recording is made in the grooves, the data previously recorded on the land is disturbed. As this disturbance becomes large, the BER of the land becomes worse. In this example, a recording power at which the BER of the land exceeded $1 \times 10^{-4}$ was regarded as the maximum recording power.

Table 1 shows that the magneto-optical disk of the present invention was able to realize a recording power margin equal to that of the magneto-optical disk of the comparative example. Thus, the present invention had the advantage of reducing the minimum recording power (see the above (b)) while at the same time the recording power margin was not affected.

Generally, a medium requiring a low recording power tends to generate cross-write readily at a high recording power. However, such tendency was not observed with the magneto-optical disk of the present invention. That is considered because the metal film 4 was as thin as 2 nm, the travel of heat in the direction of the thickness of the film was dominant, and the phenomenon of cross-write due to heat diffusion in the in-plane direction did not take place readily. It is clear that the cross-write phenomenon is more remarkable as the pitch of tracks is narrower.

Table 2 gives an example explaining a relationship between the track pitch and the recording power margin.

TABLE 2

| Track Pitch | 0.50 μm | 0.55 μm | 0.60 μm |
|---|---|---|---|
| Recording Power Margin | ±13% | ±18% | ±26% |

The above table shows that with a track pitch of 0.60 μm realized a recording power margin twice as large as that with a track-pitch of 0.50 μm.

Further, as described later (in Example 2), since the cross-write phenomenon caused by the heat diffusion in the in-plane direction becomes more remarkable as the thickness of the metal film 4 increases, the upper limit of the thickness of the metal film 4 was determined from the viewpoint of the recording power margin. However, the upper limit of the thickness of the metal film 4 may vary greatly depending upon the track pitch applied to the recording medium. It is also clear that the upper limit of the metal film 4 depends on the material for the metal film and the heat conductivity of the metal film 4.

(d) Reproducing Power Margin

Figure 4:
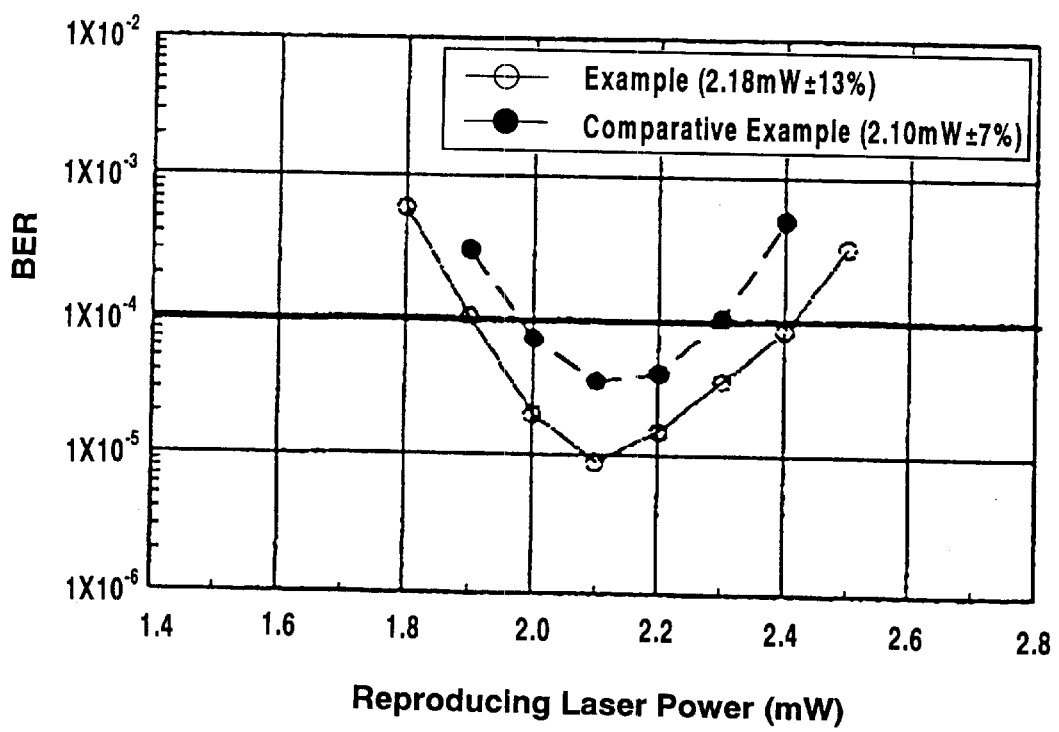
FIG. 4 is a graphical representation showing results of measurement of a reproduction power margin in accordance with Example 1.

First, explanation is given to the way of determining the reproducing power margin. A mean recording power obtained through the determination of the recording power margin was used for recording in a land and both adjacent grooves. The BER of the land was determined with changing the reproducing power, and a range of reproducing power at which the BER was better than $1 \times 10^{-4}$ was obtained. It was found that the reproducing power margin became larger than that with the comparative example. FIG. 4 is a graphical representation of the results in Table 1.

The following are considered to be reasons why the margin enlarged in the present invention: According to the principle described in the above (a), first, the C/N increased (see the above (a)) and the BER itself improved (see FIG. 4); secondly, the improved heat response suppressed heat transmission in the in-plane direction and as a result, cross-write from adjacent grooves declined. In MSR devices, since the effective aperture became larger with increase of the reproducing power, the degree of mixture of signals recorded in adjacent tracks (grooves in this case) increased at a higher reproducing power. In other words, the cross-write increased and the BER deteriorated. However, as clearly shown in FIG. 4, the disk of the present invention exhibited better BERs at higher production powers than the comparative example. That is, the effect of reducing cross-write was greater than with the disk of the comparative example. Thus, it has become clear that the metal film 4 of the present invention had the effect of reducing the cross-write during reproduction.

As described above, the C/N, the minimum recording power, the recording power margin and the reproducing power margin were able to be improved according to this example. A principle leading to such effects is considered to be that the metal film 4, which had a better thermal conductivity than the reproducing magnetic layer 3, could suppress the heat diffusion in the reproducing magnetic layer 3.

In the above example, the dielectric layer 5 was provided for enhancing resistance to environment. However, according to the above-explained principle, if the dielectric layer 5 is removed, the heat in the reproducing magnetic layer 3 may be more readily to be let out toward the recording magnetic layer 6, which may lead to the possibility of improving the effect further.

Example 2

Magneto-optical disks of this example had the same construction as that of Example 1 (shown in FIG. 1) except that the thickness of the metal film 4 was varied within the range of 2 to 30 nm and the thickness of the substrate was 0.6 mm or 1.2 mm. The characteristics of the magneto-optical disks were evaluated. The results are shown in Table 3. Determination conditions are shown in Table 4.

TABLE 3

| Thickness of Metal Film (A1) | Condition A | | | Condition B | | |
|---|---|---|---|---|---|---|
| | Recording Power Margin | Minimum Recording Power | Reproducing Power Margin | Recording Power Margin | Minimum Recording Power | Reproducing Power Margin |
| 0 nm | ±13% | 10.0 mW | ±7% | ±20% | 5.3 mW | ±15% |
| 2 nm | ±13% | 9.0 mW | ±13% | ±23% | 5.0 mW | ±22% |
| 6 nm | ±13% | 9.2 mW | ±13% | ±23% | 5.1 mW | ±22% |
| 10 nm | ±10% | 10.5 mW | ±13% | ±17% | 5.6 mW | ±22% |
| 20 nm | ±8.5% | 11.0 mW | ±11% | ±14% | 6.0 mW | ±22% |
| 30 nm | ±4% | 11.7 mW | ±10% | ±10% | 6.6 mW | ±22% |

TABLE 4

| | Thickness of Substrate | Recording Mark Pitch (in a radial direction) | Light Pickup | Disk Linear Speed | Recording Pulse duty | BER Evaluation Modulation Pattern | Minimum Mark length |
|---|---|---|---|---|---|---|---|
| Condition A | 0.6 mm | 0.50 μm (L/G) | 640 nm NA 0.50 | 5 m/sec | 30% | NRZI | 0.210 μm |

TABLE 4-continued

| | Thickness of Substrate | Recording Mark Pitch (in a radial direction) | Light Pickup | Disk Linear Speed | Recording Pulse duty | BER Evaluation Modulation Pattern | Minimum Mark length |
|---|---|---|---|---|---|---|---|
| Condition B | 1.2 mm | 0.95 μm (L only) | 680 nm NA 0.55 | 1.6 m/sec | 50% | (1, 7) RLL | 0.275 μm |

A first great difference between conditions A and B ray in the recording mark pitch. Condition A was the same as the above-described Example 1. The width of the land/the groove was about 0.5 μm/about 0.5 μm. Since recording was performed in both the land and the groove, an interval of recording marks in a radial direction was 0.5 μm. Under condition B, on the other hand, the width of the land/the groove was about 0.6 μm/about 0.35 μm. This was an example of a substrate in which the land was wider than the groove and only the land was used as data area. Since recording was not performed in the groove, the interval of the recording marks in the radial direction was 0.95 μm, which was much larger than under condition A.

A next difference lay in the disk linear speed and the recording pulse duty. Generally, the slower the linear speed is and the larger the recording pulse duty is, the less power is required for recording. In other words, the diffusion of heat in the medium becomes greater as the linear speed is slower, and accordingly the cross-write phenomenon is more likely to occur.

Under both conditions A and B, the recording power margin decreased and the minimum recording power increased where the thickness of the metal film exceeded 10 nm. The reason for the decrease of the recording power margin, the inventors presume, was that as the metal film 4 was thicker, the in-plane heat diffusion within the metal film 4 became large and the cross-write phenomenon became greater.

It is considered that the minimum recording power rose because the heat absorption in the metal film 4, including the above-described heat diffusion in the film, increased with the increase of the thickness of the metal film 4. As regards the reproducing power margin, it was larger, with any of the thicknesses of the metal film 4, than that of the disk of the comparative example, which was not provided with the metal film 4 (the thickness of the metal film=0 nm in Table 3). It is considered that the reason why the reproducing power margin declined to some extent with thicknesses of 20 nm and 30 nm under condition A was that the heat diffusion in the in-plane direction increased and the cross-talk increased. It is considered that under condition B, the reproducing power margin did not decline even if the thickness of the metal film was 20 nm or 30 nm, since the recording mark pitch was large.

The upper limit of the metal film 4 of the present invention may be estimated from the following two points: Recording power margins of about ±8% or more may be practically preferable; and the maximum recording power that the light pickup has. As regards the maximum recording power, for example, in the case of the light pickup used under condition A, a laser mounted thereto was one of those having the largest rated output (with a maximum output of 30 mW when used for continuous light production) which was available at present. However, its maximum recording power at 30% pulse light production was about 13.5 mW because of light losses caused by a lens and other optical components. For the same reason, the maximum recording power of the light pickup under condition B was about 8 mW. In the examples of the present invention, the recording was not carried out over the maximum recording power because such recording may lead to destruction of the laser. With a disk sample having a poor recording power sensitivity, the upper limit of the recording power margin is determined not by the cross-write but by the maximum recording power.

As understood from the experiment results shown in Table 3, the upper limit of the metal film 4 is thought to be about 20 nm from the viewpoint of the recording power margin (±8% or more) under condition A. More particularly, in the case of the recording mark pitch is very small, i.e., 0.5 μm, the upper limit of about 20 nm is determined from the cross-write as the main factor.

In the condition B, on the other hand, the upper limit is determined not from the cross-write but from the maximum recording power. Even in the case where the metal film had a thickness of 30 nm, the BER deterioration due to the cross-write during recording at the maximum recording power of 8 mW was slight and did not become worse than $1 \times 10^{-4}$. Therefore, in the case where the recording mark pitch is relatively large, e.g., 0.95 μm as under condition B, favorable characteristics can be obtained even if the thickness of the metal film is 30 nm. However, it is clear that it is more preferable that power necessary for recording is lower from the viewpoints of power consumption and life of the semiconductor laser, provided that the same performance is ensured. If an about 10% loss in recording power is acceptable compared with the recording power sensitivity of the disk of the comparative example without the metal film 4, the thickness of the metal film 4 may preferably be about 20 nm or less.

In addition to that, it is understood from the results shown in Table 3 that more preferably the metal film 4 has a thickness of about 6 nm or less. For, compared with the case not provided with the metal film 4, considerably favorable effects of no loss in the recording power and a wider reproducing power margin can be obtained.

The above-described results are true with the construction without the dielectric layer 5. The most desirable thickness of the metal film 4 is 6 nm or less.

Example 3

Magneto-optical disks of this example had the same construction as that of Example 1 (shown in FIG. 1) except that the material for the metal film 4 was varied. The thickness of the metal film 4 was 2 nm. The characteristics of the magneto-optical disks were determined. Conditions for determination were the same as those shown in Table 4 in Example 2. The results are shown in Table 5.

TABLE 5

|  | Al (4N) | Al (3N) | Al (JIS) | AlNi | AlSi | AlTi | AgTi |
|---|---|---|---|---|---|---|---|
| C/N (dB) | 44.2 | 44.5 | 44.5 | 44.5 | 44.5 | 44.5 | 44.5 |
| Minimum Recording Power | 9 mW | 9 mW | 9 mW | 9 mW | 9 mW | 9 mW | 9 mW |
| Recording Power Margin | ±13% | ±13% | ±13% | ±13% | ±13% | ±13% | ±13% |
| Reproducing Power Margin | ±13% | ±13% | ±13% | ±13% | ±13% | ±13% | ±13% |
| Repeated Recording Characteristic | Δ | ○ | ⊙ | ⊙ | ⊙ | ⊙ | ⊙ |

As aluminum films, used were those produced by sputtering three kinds of Al targets having purities of 4N (99.99%) and 3N (99.9%) and an Al target in compliance with a JIS standard (an aluminum purity of 99.5% or more) using Ar gas, for comparison. AlNi, AlSi, AlTi and AgTi films contained 5 atomic % of Ni, 5 atomic % of Si, 5 atomic % of Ti and 5 atomic % of Ti respectively.

As regards repeated recording characteristics, it is generally thought that a rise in temperature during recording causes a local crystallization in aluminum films and that as recording is repeated over and over again, the degree of crystallization proceeds and the size of crystal grains enlarges, which results in a gradual increase in noise during reproduction and a decline in the quality of signals. This phenomenon was more remarkable with aluminum films of higher purities. In the case of using the 4N-Al film, a deterioration of about 1 dB in the C/N was observed after $10^3$ recordings/erasings. In the case of using the 3N-Al film, a slight decline in the C/N was observed even after more than $10^5$ repeated recordings, and in the case of using the AlNi, AlSi, AlTi and AgTi films, decline in the C/N was yet smaller. It was found that Al, AlNi, AlSi and AlTi films produced using a target having a lower purity than 3N were preferable for practical use.

In AlNi, AlSi and AlTi, as the addition amount of Ni, Si and Ti increases, the thermal conductivity declines. A smaller addition amount is more preferable provided that it is sufficient for preventing degeneration of the Al films. This is because the higher the thermal conductivity of the metal film is than that of the reproducing magnetic layer 3, the less heat the reproducing magnetic layer 3 retains therein. However, as described, it is clear that the effect of the present invention can be obtained by providing a film having a higher thermal conductivity than the reproducing magnetic layer 3 as the metal film 4. The addition amount and the material for the metal layer are not limited to those mentioned here as experimental data.

In some cases of Al films produced by sputtering with use of the Al target of the 4N purity, a rise in noise was observed in comparison with a case having no Al film, independently of the repeated recordings, though it was small. The following is considered to be the cause of this rise: If the purity of aluminum is too high, the produced Al film sometimes becomes cloudy depending on sputtering conditions (e.g., pressure of a sputtering gas, an ultimate vacuum degree, a difference between Rf/DC discharges, etc.). The film looks cloudy because light is scattered due to local crystallization. This cloudy phenomenon results in a rise in noise during reproduction even with a film as thin as 2 nm. For this reason, such a rise in noise was not observed with the AlNi, AlSi and AlTi films in which the impurities were added for preventing the cloudy phenomenon. Also no rise in noise was not observed with the Al films using the 3N and JIS standard aluminum having a low purity.

Example 4

Magneto-optical disks of this example had the same construction as that of Example 1 (shown in FIG. 1) except that AlNi was used for the metal film 4 and the thickness of the metal film and the Ni content therein were varied. The characteristics of the magneto-optical disks were determined. Determination conditions were the same as condition A shown in Table 4 in Example 2. The thermal conductivity of AlNi was expected to be lower than other materials AlSi and AlTi if the contents of Ni, Si and Ti are the same. Accordingly, the experiment in this example was carried out using AlNi. It was expected that where the thermal conductivity was low, heat tended to stay in the film and therefore the recording cross-talk was adversely affected, especially in the case where the recording mark pitch (in the radial direction) was narrow. For this reason, AlNi was selected as the material, and a film containing 10 atomic % of Ni, which was thought to have the lowest thermal conductivity, was also evaluated. The results are shown in Table 6.

TABLE 6

| Ni Content and Thickness of AlNi Metal Film | Condition A | | |
|---|---|---|---|
| | Recording Power Margin | Minimum Recording Power | Reproducing Power Margin |
| 0 nm | ±13% | 10.0 mW | ±7% |
| Ni 5 atomic %, 2 nm | ±13% | 9.0 mW | ±13% |
| Ni 5 atomic %, 6 nm | ±12% | 9.5 mW | ±13% |
| Ni 5 atomic %, 10 nm | ±9% | 10.2 mW | ±12% |
| Ni 5 atomic %, 20 nm | ±8% | 10.5 mW | ±11% |
| Ni 10 atomic %, 2 nm | ±13% | 8.8 mW | ±13% |
| Ni 10 atomic %, 6 nm | ±11% | 9.2 mW | ±13% |
| Ni 10 atomic %, 10 nm | ±8% | 10.0 mW | ±11% |
| Ni 10 atomic %, 20 nm | ±7% | 10.5 mW | ±10% |

Substantially good results were obtained. However, the recording power margin fell slightly below ±8% with an AlNi film containing 10 atomic % of Ni and having a thickness of 20 nm. This experiment showed that favorable results could be obtained even in the evaluation of a medium using an AlNi film (containing 10 atomic % of Ni) which was expected to be the poor in the thermal conductivity and having an extremely narrow recording mark pitch of 0.5 μm, provided that the thickness of the metal film was 20 nm or less.

Further, it is expected that good results will be obtained if the thickness is about 30 nm or lower if the material has a higher thermal conductivity than AlNi (containing 10 atomic % of Ni).

In addition, Table 6 shows that a good effect can be obtained with use of a metal film containing 10 atomic % of an impurity which is thought to have a poor thermal conductivity, provided that the metal film has a thickness of 6 nm or less. These results are true with a construction without the dielectric layer 5.

Example 5

Figure 2:
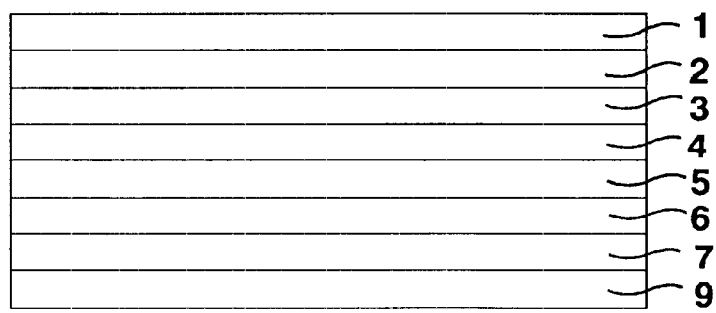
FIG. 2 is a diagram illustrating a construction of films in a magneto-optical recording medium in accordance with Example 2 of the present invention.

As shown in FIG. 2, a magneto-optical disk in accordance with this example was constructed to have a substrate 1, a transparent dielectric layer 2, a reproducing magnetic layer 3, a metal film 4, a dielectric layer 5, a recording magnetic layer 6, a dielectric layer 7 and an overcoat layer 9 laminated in this order from the photo-receptive side. It is noted that the substrate 1 and the overcoat layer 9 are replaced with each other in the case of a magneto-optical disk which receives light on the side where the films are formed.

The disk of this example had the same construction as that of Example 1 except that the heat radiation layer 8 was not used, the substrate 1 was 1.2 mm thick and AlNi (containing 5 atomic % of Ni) having a thickness of 2 nm was used as the metal film 4.

Used as a comparative example was a disk having a heat radiation layer between the dielectric layer 7 and the overcoat layer 9 of the disk of this example. This construction was similar to the disk in Example 2 that had the metal film 4 of 2 nm thickness but the metal film 4 was formed of AlNi (containing 5 atomic % of Ni) in place of Al (of the 3N purity). The characteristics of these magneto-optical disks were determined. Determination conditions were the same as condition B in Table 4. The results are shown in Table 7.

TABLE 7

| | Reproducing Power Margin | Minimum Recording Power |
|---|---|---|
| Without Heat Radiation Layer (Example 5) | ±18% | 4.5 mW |
| With Heat Radiation Layer (Example 2: Metal Film AlNi 5 atomic %, 2 nm) | ±22% | 5.0 mW |

Table 7 shows that the medium of this example had a slightly narrower reproduction power margin than Example 2 which was provided with the heat radiation layer 8. However, since a practically preferable reproduction power margin is about ±12% or more, the construction of this example is considered to be practically usable.

It is thought that the reason why the reproduction power margin narrowed was that the absence of the heat radiation layer 8 decreased the transmission of heat from the producing magnetic layer 3 to the recording magnetic layer 6, which led to a decline in heat response and as a result, a decrease in the C/N.

Table 7 also shows that the minimum recording power reduced by about 0.5 mW. It is considered that the absence of the heat radiation layer 8 reduced the thermal capacity of the whole magneto-optical medium and therefore that heat necessary for recording was able to be obtained even by a light beam having a lower power.

The construction of this example is useful for a magneto-optical medium which is used for application not requiring a very high-density recording or whose minimum recording power must be reduced (e.g., in the case where more emphasis is placed on the life of a laser and/or power consumption).

Also, in this example, the dielectric layer 5 may be excluded as in Example 1.

Also, in this example, the thickness of the metal film 4 is preferably 30 nm or less, more preferably 6 nm or less.

Example 6

Figure 3:
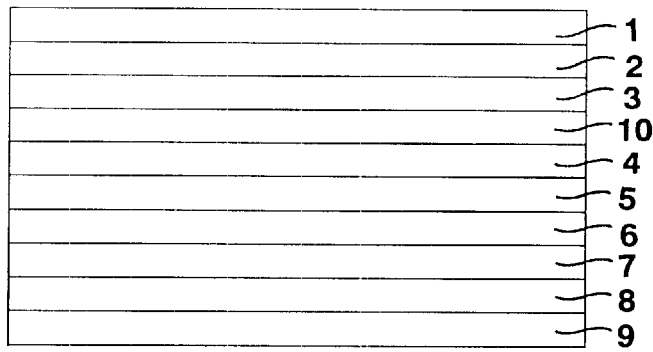
FIG. 3 is a diagram illustrating a construction of films in a magneto-optical recording medium in accordance with Example 3 of the present invention.

As shown in FIG. 3, a magneto-optical disk in accordance with this example was constructed to have a substrate 1, a transparent dielectric layer 2, a reproducing magnetic layer 1, a dielectric layer 10, a metal film 4, a dielectric layer 5, a recording magnetic layer 6, a dielectric layer 7, a heat radiation layer 8 and an overcoat layer 9 laminated in this order from the photo-receptive face. In the case of a magneto-optical disk which receives light on the side where the films are formed, the substrate 1 and the overcoat layer 9 are replaced with each other.

The construction of this example was substantially the same as that of Example 1 except that an AlN film of 3 nm thickness was provided as a dielectric layer 10 between the reproducing magnetic layer 3 and the metal film 4 and an AlNi film (containing 5 atomic %, of Ni) was provided as the metal film 4. The comparative example used in Example 1 and a disk having the construction of this example but lacking the dielectric layer were used as comparative examples. This construction was the one of Example 3 with its metal film 4 made of AlNi (containing 5 atomic % of Ni). The characteristics of these magneto-optical disks were determined. Determination conditions were the same as in example 1. The results (data of Land) are shown in Table 8.

TABLE 8

|  | C/N | Minimum Recording Power | Recording Power Margin | Reproducing Power Margin |
|---|---|---|---|---|
| With Dielectric (Example 6) | 44.3 dB | 9.2 MW | ±13% | ±12% |
| Without Dielectric (Example 3) | 44.5 dB | 9.0 mW | ±13% | ±13% |
| Comparative Example | 43.0 dB | 10.0 mW | ±13% | ±7% |

Table 8 shows that the characteristics of this example were poorer to some extent than those of Example 3. However, they showed improvement over the comparative example and exhibited sufficient values for practical use. Therefore, it was also found that the construction of this example was practically usable.

Further, in this example, since the dielectric layer 10 which was thermally stable was disposed in contact with the reproducing magnetic layer 3, other atoms did not mix into the reproducing magnetic layer 3 easily. Accordingly, repeated recording characteristics and long-term reliability were further improved. It is understood from the results in Table 5 of example 3 that the repeated recording characteristics were sufficiently good for practical use in the case of using Al having a purity of 3N or less. There is a possibility that the repeated recording characteristics and the long-term reliability become more significant under severer conditions. In such a case, the construction of this example may be useful.

It is assumed that the reason for the decline in the characteristics shown in Table 8 was that the provision of the dielectric layer 10, which was poor in thermal conductivity, between the reproducing magnetic layer 3 and the metal film 4 declined the effect of dissipating heat by the metal film 4. Clearly, the thicker the dielectric layer 10 is, the less effective the metal film (heat response enhancing film) 4 becomes. Therefore the thickness of the dielectric layer is desirably small (10 nm or less). Also taking stability in forming the film into consideration, the thickness of the dielectric layer 10 is desirably 1 nm or more.

Also, in this example, the dielectric layer 5, which is poor in thermal conductivity may be excluded as in Example 1.

Also, it is possible to exclude the heat radiation layer 8 from the construction of this example. The effect of such a construction is the same as of Example 5.

According to the present invention, the presence of the metal film in proximity of the reproducing magnetic film can improve the quality of reproducing signals and the recording and reproducing characteristics of the magneto-optical recording medium. Therefore, a higher-density recording and reproduction can be achieved.

If the thickness of the metal film is 30 nm or less, the cross-write phenomenon and the maximum recording power are not changed for the worse.

If the thickness of the metal film is 6 nm or less, loss in recording power is hardly seen and therefore, the recording power margin widens.

If a heat radiation layer higher in thermal conductivity than the recording magnetic layer is provided on the side of the recording magnetic layer opposite to the reproducing magnetic layer, heat in the reproducing magnetic layer can be let to escape through the recording magnetic layer and therefore, the recording characteristics can be improved further.

If a thermally stable dielectric layer is provided in a thickness of 1 nm or more and 10 nm or less between the reproducing magnetic layer and the metal layer, the repeated recording characteristics and the long-term reliability improve further.

Furthermore, according to the production process of the present invention, good repeated recording characteristics and good reproducing signals can be obtained.

What is claimed is:

1. A magneto-optical recording medium comprising:
   a reproducing magnetic layer having a magnetic layer which is in an in-plane magnetization state at room temperature but shifts to a perpendicular magnetization state as temperature rises,
   a dielectric layer,
   a recording magnetic layer having a magnetic layer which exhibits a perpendicular magnetization, sequentially from a photo-receptive side,
   wherein the dielectric layer is between the reproducing magnetic layer and the recording magnetic layer,
   the recording medium further comprising a metal layer between the reproducing magnetic layer and the dielectric layer wherein the metal layer includes a metal having a thermal conductivity higher than that of the reproducing magnetic layer, so that the metal layer and the dielectric layer are both between the reproducing magnetic layer and the recording magnetic layer.

2. A magneto-optical recording medium according to claim 1, wherein the thickness of the metal layer is 30 nm or less.

3. A magneto-optical recording medium according to claim 2, wherein the thickness of the metal layer is 6 nm or less.

4. A magneto-optical recording medium according to claim 1, wherein the metal layer contains at least one of Al, AlNi, AlSi, AlTi and AgTi.

5. A magneto-optical recording medium according to claim 1, further comprising a heat radiation layer having a higher thermal conductivity than the recording magnetic layer, the heat radiation layer being located on a side of the recording magnetic layer opposite the reproducing magnetic layer.

6. A magneto-optical recording medium according to claim 1, further comprising another dielectric layer having a thickness of from 1 nm to 10 nm between the reproducing magnetic layer and the metal layer.

7. The medium of claim 1, wherein the metal layer contacts the reproducing magnetic layer and the dielectric layer contacts the recording magnetic layer.

8. The medium of claim 1, wherein the metal layer contacts the reproducing magnetic layer.

9. The medium of claim 1, wherein the metal layer is a metal film having a thermal conductivity higher than the thermal conductivity of the reproducing magnetic layer.

10. The medium of claim 9, wherein the metal layer is non-magnetic.

11. A magneto-optical recording medium comprising:

a reproducing magnetic layer having a magnetic layer which is in an in-plane magnetization state at room temperature but shifts to a perpendicular magnetization state as temperature rises, a recording magnetic layer having a magnetic layer which exhibits a perpendicular magnetization, sequentially from a photo-receptive side, and the recording medium being characterized by further comprising a metal layer having a thermal conductivity higher than that of the reproducing magnetic layer, said metal layer having a thickness less than 6 nm adjacent to the reproducing magnetic layer on a side thereof to the recording magnetic layer.

12. The medium of claim 11, wherein the metal layer comprises Al.

13. The medium of claim 11, wherein the metal layer contains at least one of Al, AlNi, AlSi, AlTi, and AgTi.

14. The medium of claim 11, further comprising a heat radiation layer having a higher thermal conductivity than the recording magnetic layer, the heat radiation layer being located on a side of the recording magnetic layer opposite the reproducing magnetic layer.

15. The medium of claim 11, wherein the metal layer has a thickness of 2 nm or less.

16. A magneto-optical recording medium comprising:

a reproducing magnetic layer having a magnetic layer which is in an in-plane magnetization state at room temperature but shifts to a perpendicular magnetization state as temperature rises, a dielectric layer, a recording magnetic layer having a magnetic layer which exhibits a perpendicular magnetization, sequentially from a photo-receptive side, and the recording medium being characterized in that a side or part of the dielectric layer closest to the reproducing magnetic layer contains more of a first metal different from a second metal included in the reproducing magnetic layer, than does a part of the dielectric layer closer to the recording magnetic layer.

17. The medium of claim 16, wherein said first metal is a metal having a thermal conductivity higher than that of the reproducing magnetic layer.

18. The medium of claim 16, wherein a metal layer contains at least one of Al, AlNi, AlSi, AlTi, and AgTi.

19. The medium of claim 16, further comprising a heat radiation layer having a higher thermal conductivity than the recording magnetic layer, the heat radiation layer being located on a side of the recording magnetic layer opposite the reproducing magnetic layer.

* * * * *